United States Patent
Stauder et al.

(10) Patent No.: US 8,270,714 B2
(45) Date of Patent: Sep. 18, 2012

(54) METHOD AND APPARATUS FOR COLOUR CORRECTION OF IMAGE SEQUENCES

(75) Inventors: Jurgen Stauder, Montreuil sur Ille (FR); Francois Le Clerc, L'Hermitage (FR); Philippe Robert, Thorigne Fouillard (FR)

(73) Assignee: Thomson Licensing, Boulogne-Billancourt (FR)

( * ) Notice: Subject to any disclaimer, the term of this patent is extended or adjusted under 35 U.S.C. 154(b) by 625 days.

(21) Appl. No.: 12/308,785

(22) PCT Filed: Jun. 28, 2007

(86) PCT No.: PCT/EP2007/056519
§ 371 (c)(1),
(2), (4) Date: Nov. 2, 2009

(87) PCT Pub. No.: WO2008/000805
PCT Pub. Date: Jan. 3, 2008

(65) Prior Publication Data
US 2010/0080457 A1    Apr. 1, 2010

(30) Foreign Application Priority Data
Jun. 30, 2006    (EP) .................................... 06291095

(51) Int. Cl.
*G06K 9/00*    (2006.01)
(52) U.S. Cl. ........ 382/167; 382/162; 382/274; 382/250; 382/251
(58) Field of Classification Search .................. 382/162, 382/167, 274, 107, 236, 245, 246, 250, 251; 358/518, 520, 523; 348/154, 155, 400.1, 348/409.1, 410.1
See application file for complete search history.

(56) References Cited

U.S. PATENT DOCUMENTS

| | | | | |
|---|---|---|---|---|
| 5,073,819 A | * | 12/1991 | Gates et al. | 348/140 |
| 6,480,624 B1 | * | 11/2002 | Horie et al. | 382/165 |
| 7,359,566 B2 | * | 4/2008 | Kita | 382/260 |
| 2003/0202715 A1 | | 10/2003 | Kinjo | |
| 2004/0197022 A1 | | 10/2004 | Gonsalves | |
| 2006/0110128 A1 | | 5/2006 | Dunton et al. | |
| 2007/0115518 A1 | * | 5/2007 | Shen et al. | 358/518 |

FOREIGN PATENT DOCUMENTS

| | | |
|---|---|---|
| EP | 0947956 | 10/1999 |
| EP | 1435560 | 7/2004 |
| EP | 1599031 | 11/2005 |
| WO | WO 87/06419 | 10/1987 |

OTHER PUBLICATIONS

Search Report Dated Nov. 9, 2007.

* cited by examiner

*Primary Examiner* — Ali Bayat
(74) *Attorney, Agent, or Firm* — Tutunjian & Bitetto, P.C.

(57) ABSTRACT

A visual summary of the image sequences is generated, displaying at least one image from a plurality of the image sequences. Color correction is applied to a feature in one of the displayed images and images comprising at least one feature being close to the color corrected feature according to a distance criterion are selected, displayed, and color correction, based on the color correction to the feature, is applied to the features in the selected images. An apparatus is also provided.

9 Claims, 2 Drawing Sheets

METHOD AND APPARATUS FOR COLOUR CORRECTION OF IMAGE SEQUENCES

This application claims the benefit, under 35 U.S.C. §365 of International Application PCT/EP2007/056519, filed Jun. 28, 2007, which was published in accordance with PCT Article 21(2) on Jan. 3, 2008 in English and which claims the benefit of European patent application No. 06291095.5, filed Jun. 30, 2006.

FIELD OF THE INVENTION

The present invention relates generally to colour correction, and particularly to colour correction of sets of image sequences.

BACKGROUND OF THE INVENTION

In the age of introduction of digital film processing and digital cinema, multiple digital processing steps appear in the classically analogue cinematographic workflow. While digital special effect generation and post-production have been common for some time, digital cameras and new digital display devices and digital media become more and more widespread. The digital equipment completely changes the analogue habits during capture and post-processing. While digital technologies bring new features, they also represent a danger for artistic experience and heritage. It is thus necessary to transfer known artistic effects from conventional cinematographic post-production into digital cinema post-production. Since the introduction of digital cinema is long term, technologies for co-existing analogue and digital processes also have to be studied. This may for example concern a film captured by an analogue film camera and then displayed by a digital projector, or integration of digital special effects in an analogue film production chain.

One artistic workflow is colour correction, which is applied during post-production to raw film material to compensate for illumination colour artifacts. Colour correction is also applied before film distribution to fine-tune the colour tones in order to realise artistic intent for certain scenes. Colour correction is further applied to photographs, paintings or graphics before printing. Colour correction may be applied for a sequence of video frames, for a single video frame, for still images or even for parts of an image, such as an object; for example, in photographs, colour correction is commonly used to remove "red" eyes.

Colour correction is usually performed in cooperation between the artistic director and highly skilled operators. The artistic director describes the intent of colour correction while the operator transforms the intent into a colour transform applied to the visual content. During this process, the artistic director and the operator have to consider the impact of the applied colour correction. Prior art colour correction is usually only applied to a current content subset—e.g. a single image or a single visual object in a single image of the visual content, such as a film, a set of associated images or other type of visual support. The colour correction is chosen such that the current content subset gives the aimed appearance of the current content subset. Thereafter, the chosen colour correction is often applied to a number of images of the same or similar object in a number of images.

Since colour correction does not take into account the totality of visual content at a time, a number of problems may arise.

A first problem may arise when colour correction is applied to a single image or to a number of images showing related scenes, such as a shot in a film. The corrected image or images may then appear in an unwanted manner when compared to other images, such as the following shot of the film. In other words, colour correction carried out independently for different shots may result in unconsidered and unwanted colour effects at shot transitions.

A second problem may arise when colour correction is chosen and applied to a single object in a single image or in a number of images showing related scenes. The same colour correction applied to all occurrences of the object in the visual content may lead to unwanted colour appearances in other images of the visual content than those used for choosing the colour correction. This may for example happen when the composition of colours in the other images is different from the composition of colours in the images used for the choice the colour correction.

It can therefore be appreciated that there is a need for an improved method and system for colour correction of image sequences.

SUMMARY OF THE INVENTION

In a first aspect, the invention is directed to a method for colour correction of a set of images sequences. A visual summary of the image sequences is generated, in order to select and to display at least one image from a plurality of the image sequences. Colour correction is applied to a feature in one of the selected and displayed images. Images comprising at least one feature being close to the colour corrected feature according to a distance criterion are selected using again the same visual summary, then displayed for a second selection, and colour correction, based on the colour correction to the at least one feature, is applied to features in the second-selected images.

In a second aspect, the invention is directed to an apparatus for colour correction of a set of images sequences. The apparatus comprises a processor adapted to access a mass storage to generate a visual summary of image sequences therein, display at least one image from a plurality of the image sequences on a display functionally connected to the processor, receive from a user input interface colour correction instructions for a feature in one of the displayed images, apply the colour correction instructions to the feature, select images comprising at least one feature similar or identical to the colour corrected feature, display the selected images on the display, and apply colour correction, based on the colour correction to the feature, to features in the selected images.

The subject of the invention is also a met hod for colour correction of a set of images comprising the following steps:
  performing a visual summary of said set of images, said summary comprising a selection operator able to select at least one representative key image among images of said set and at least one relationship operator able to calculate a distance between images according a given relationship between these images,
  a first selection of at least one representative key image among the images of said set of images, using said selection operator;
  the application of a reference colour correction to said selected at least one representative key image;
  a second selection of images according to a distance criterion related to said representative key image, using the at least one relationship operator;
  a third selection of images to be corrected at least among images of the second selection, and the application of colour correction to images of said third selection, said colour correction being based on said reference colour correction.

The representative key image is preferably displayed to perform the first selection.

The second selection is performed, preferably automatically, among images that are related to the same representative key frame, and that may belong to the same shot, or to the same scene, or to any same subset of images. The word "related" implies a specific "relationship" that is associated with a "relationship operator" that is able to calculate a distance between related images, i.e. between any second selected image and the representative key frame. Using this "relationship operator", all images that meet the distance criterion are considered as 'close' to the representative key frame and become part of the second selection.

The images of the second selection are preferably displayed in order to allow an operator to perform manually the third selection. "For example, during this third selection, the operator can eliminate some of the images that have been selected by the second selection, that is generally preformed automatically. He also may add images manually that did not have been selected by the second selection operation. The operator then indicates that he wishes to colour correct not only the representative key image but all the images of the same shot that are in relationship with this the representative key image, as for example being "represented" by this representative key image. The operator may want to add the first and the last image of the shot that is represented by the representative key image, as well as the last image of the preceding shot and the first image of the following shot in order to visualize transition effects between succeeding shots."

The colour correction that is applied to images of the third selection is based on the reference colour correction that has been previously applied to the representative key image. When the reference colour correction concerns, for instance, only a single object in the representative key image, the same colour correction can be applied to the occurrence of a similar object in the third selection of close images. This colour correction may also be applied to these objects in these images in an adaptive way, i.e. in a way depending of the colour composition of these images. For example, if the colour correction is an increase of saturation of an object, the saturation may be more increased in saturated images than in non-saturated images of the third selection.

Preferably, the relationship according to which the relationship operator is able to calculate a distance between images for said second selection is related to said reference colour correction that is applied to this representative key image.

Consequently, all images of the second selection have an importance with respect to the reference colour correction.

Preferably, all images of said second selection comprise preferably at least one feature which is close to a feature of the selected at least one representative key image that has been corrected by said application of the reference colour correction.

Preferably, the relationship operator that is used for said second selection comprises at least one descriptor that is chosen in the group formed by a colour histogram operator, a distribution of spatial frequency band energies operator, and a distribution of contour directions of objects operator.

Preferably, said visual summary comprises a segmenting operator that is able to define (216) subsets of images that group consecutive images of said set of images. Such a segmenting operator generally comprises visual descriptors to be applied to the images of a set to segment, a comparison descriptor that is able to compare the extraction of the visual descriptors that is adapted to detect temporal cuts within the set of images to cut, so as to define each subset of images as grouping all consecutive images located between consecutive cuts.

Preferably, the relationship operator that is used for said second selection is able to detect (219) at least one similar object in related images.

Preferably, the distance that is calculated by the relationship operator that is used for said second selection is a temporal distance between these images.

Preferably, the third selection is performed by a visual comparison of images of said second selection with said representative key image. Such a comparison is then performed by an operator looking at these images displayed on a display device.

Preferably, the first selection operator is based on one of said at least relationship operator.

The subject of the invention is also an apparatus for colour correction of a set of images that it is able to implement the method according to the invention.

BRIEF DESCRIPTION OF THE DRAWINGS

Preferred features of the present invention will now be described, by way of example, with reference to the accompanying drawings, in which.

DETAILED DESCRIPTION OF PREFERRED EMBODIMENTS

In the following exemplary embodiment, the invention is described for the case of colour correction of a film or a video sequence; i.e. a global set of images. In the following exemplary embodiment, the word "frame" is equivalent to the word "image".

Figure 1:
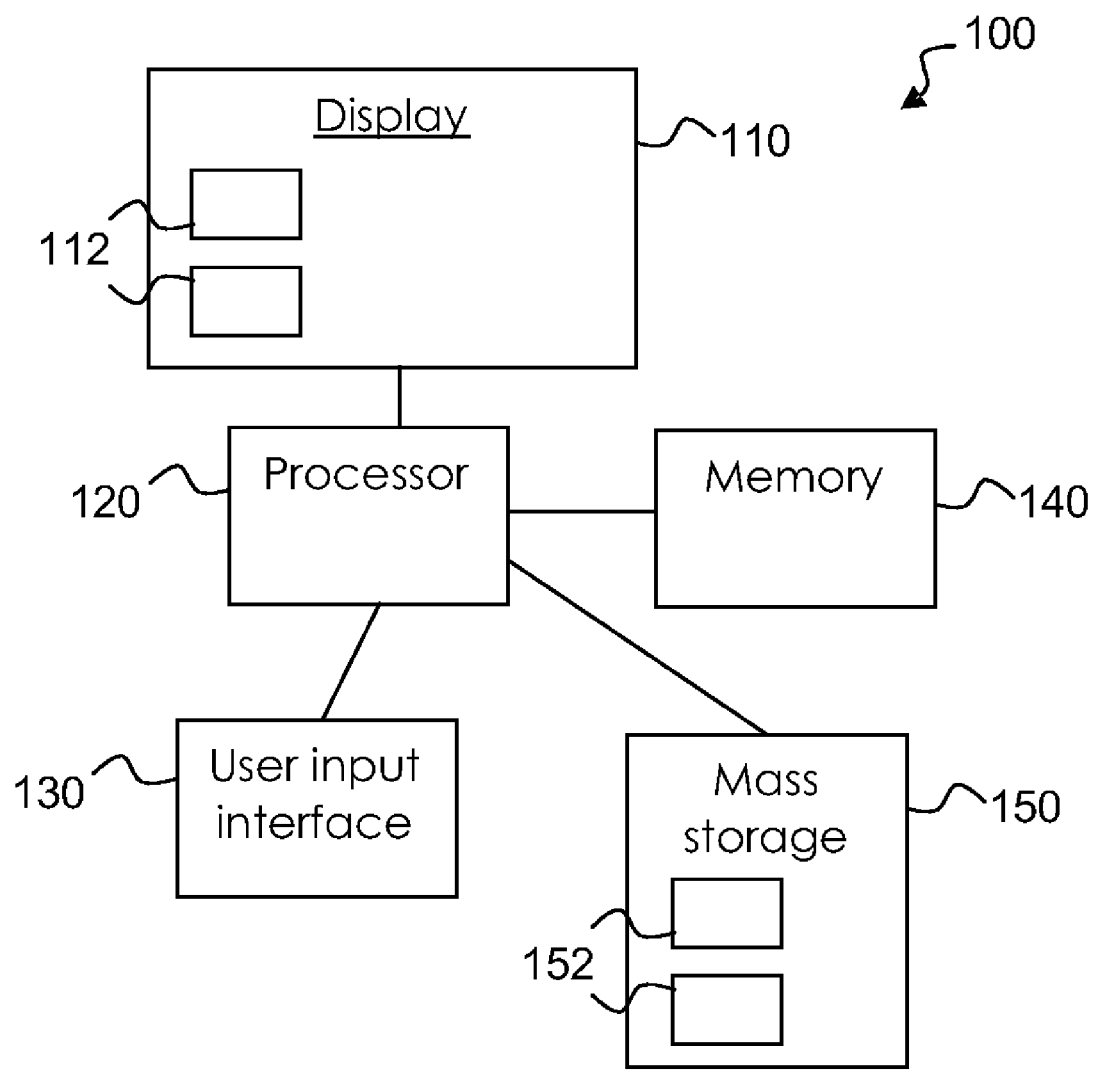
FIG. 1 illustrates a system for colour correction according to a preferred embodiment of the invention.

FIG. 1 illustrates a system 100 for colour correction according to a preferred embodiment of the invention. The system comprises a display 110 for displaying images (exemplified by images 112), a user input interface 130 for inputting colour corrections and other instructions from the operator, a mass storage 150 for storing large amounts of images and other data (exemplified by image sequences 152), a working memory 140 for storing current images, and a processor 120 functionally connected to and controlling the named components.

Figure 2:
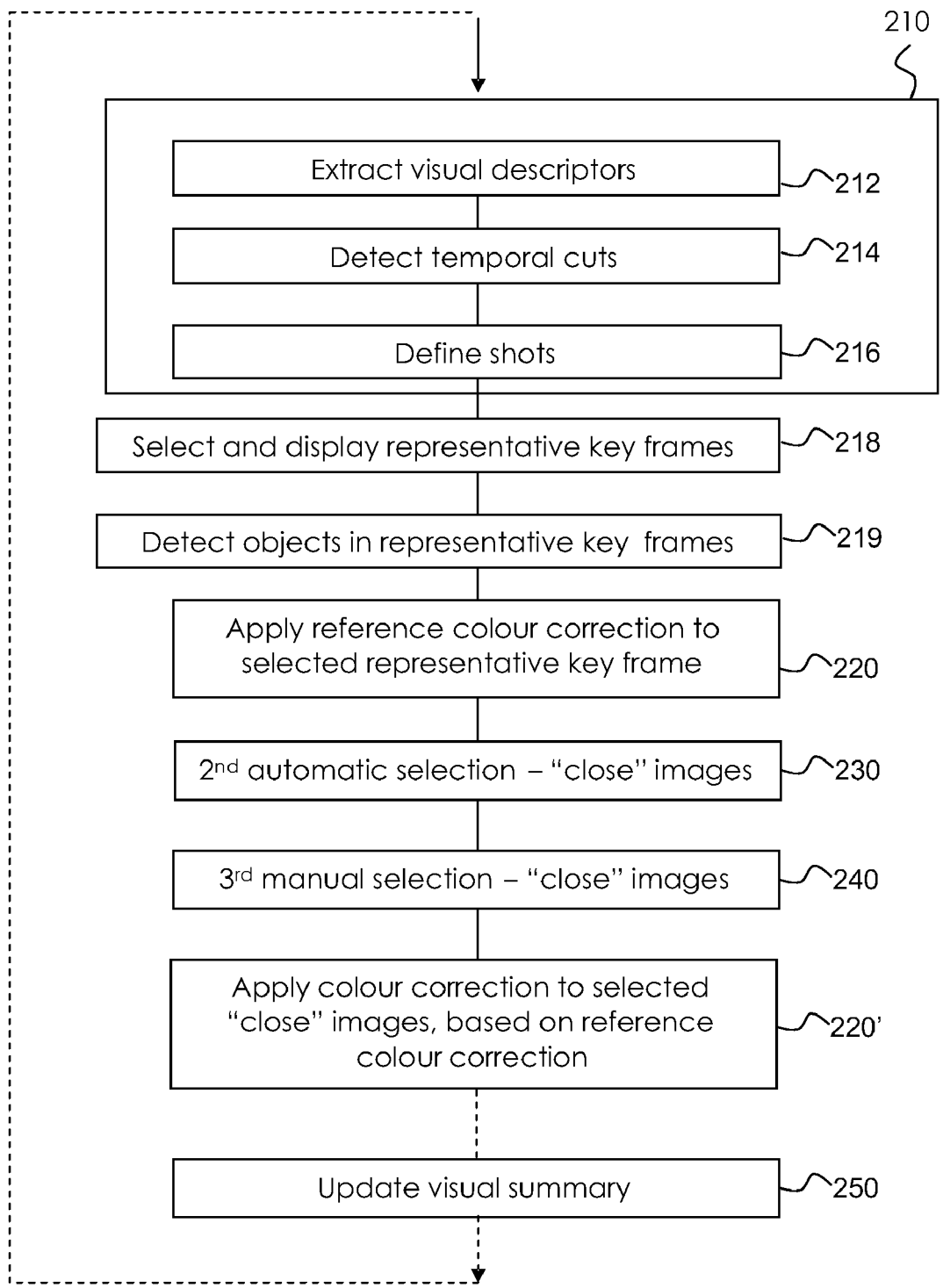
FIG. 2 illustrates a method of colour correction according to a preferred embodiment of the invention.

FIG. 2 illustrates an embodiment of a method of colour correction of a set of images, i.e. a film.

A visual summary is generated, the main part of which will be detailed progressively below. Usual so-called content summaries—e.g. the highlights of a tennis game or the major points of an interview—could be used here; the preferred visual summary of the present invention takes the summary technology in a new direction by taking into account, for this summary, purely visual, colour and texture related information in order to find common objects and common scenes in the sequence that have similar colour composition, in the sense of the artistic process of colour correction in post-production.

The first step of the method of colour correction of a set of images, i.e. a film, is a segmenting step 210, which defines a segmentation operator, comprises:

extracting 212 descriptors, such as for example colour histograms, frequency band energies, and contour directions, from each image of the set of images or from selected images of this set, comparing 214 the extraction of descriptors between couples of consecutive frames or images in order to detect temporal cuts within the set of images, defining 216 subsets of images that group all consecutive images located between two consecutive cuts, as "shots" or "sequences".

Optionally, several shots or subsets belonging to the same semantic part of the film can be grouped into a "scene", for example, a dialog between two persons showing in consecutive and repeated manner the two persons, one after the other. The first shot, showing the first person, may be grouped with the following shots showing the same person to a single semantic "scene". In the same way, several shots showing the same object, for example a car, in a similar environment can be regrouped to a single semantic "scene".

The second step is selecting 218 at least one representative key frame (or key image) from each subset, shot or sequence, then generating a set of representative key images. As a non-limiting example, this selection is performed here by detection 219 of a given object in each subset, shot or sequence. This object can be selected manually by the operator. An object detection operator is used for this detection, that is part of the so-called key image selection operator. Then, among the generated set of representative key frames, the operator chooses a representative key frame, as, for instance, a current image.

Then, as a third step, the operator applies a so-called "reference colour correction" 220 to the representative key frame, preferably using methods well known in the art. According to the state of the art, colour correct ion can be primary, i.e. applied to the whole image, or secondary, i.e. applied to a region or to an object of the image.

When the reference colour correction is applied to an object of this representative key image, characteristics of this object (such as for example shape, colour, texture, size, appearance or a combination thereof) can be learned and used in the following fourth step of the method to detect the same or similar object in other images of the visual content.

When the reference colour correction is applied to the representative key image, the type of colour correction (changed colour channels, amplitude of change, characteristic of changed image or object) can be analyzed and learned by a user preference algorithm. Typically or recently applied colour corrections can be used to select, in the following fourth step of the method, specific "close" images that are related to this representative key image (e.g. images of the same type as the current image or key frames with large response in changed colour channels).

Then, as a fourth step, a n automatic selection of images 230 is performed according to a distance criterion with the selected representative key image; more precisely, a relationship operator is used that is able to measure a distance between each image of the film, of the same shot, or of the same scene, and the selected representative key image, which is based on a relationship which is related to the reference colour correction 220. All images which meet this distance criterion are called "close" images and are considered as having importance with respect to the current colour correction operation. Important images for a current colour correction operation are defined as close to the selected representative key image according a distance criterion based on features related to colour perception such as colour histogram, texture and contours. Each image of the selected set of "close" images may, preferably depending on choice of the operator, for example be chosen according to a distance criterion between this image and the representative key image to which the reference colour correction 220 has been applied. Different examples of this second selection of "close" images are given below:

among the images having a similar object in a similar environment, i.e. among images that are related to the representative key frame with respect to the current colour correction operation 220, the operator defines a number J of images to be selected and the system chooses images that are temporally close to the selected representative key image and continuing with temporally more distant frames until J frames are selected. Here, the distance criterion comprises a temporal distance within the same shot, or scene, of group of images.

among the images of temporally following or preceding shots (or video scenes) of the film that have again a similar object in a similar environment, i.e. among images that are related to the representative key frame with respect to the current colour correction operation 220, the operator defines a number N of shots (or scenes) and/or a number M of images, and the system chooses images beginning with images that are temporally close to the selected representative key frame and continuing with temporally more distant images until N shots (or scenes) or M images are selected. Here, the distance criterion comprises a temporal distance over several shots or scenes.

by using the object detection operator that has been already used (see ref. 219) for the selection 218 of representative key images, selecting images of other shots or scenes of the film comprising the same object or a similar object as an object that has been colour corrected by the colour correction operation that has been applied to the representative key frame. Here, the relationship between a key frame to select and the current representative key image under work is performed by this common object. The operator defines a number P of images and the system chooses key frames until P key frames are selected. The system starts with temporally close key frames and takes into account a confidence value C of detected objects. The key frames containing the same or similar object are ordered by a criterion K and are selected in increasing order of K. The criterion $K_i$ for a specific key frame $F_i$ is calculated for a key frame as follows: $K_i = a_i(t-t_i)^q + b_i C_i/C$ with t being the time code of the current representative key image under work in seconds, $t_i$ being the time code of a key frame $F_i$ under selection in seconds, $C_i$ the confidence value of a detected object in this key frame $F_i$, C the confidence value of a detected object in the current representative key image under work, and $a_i$, $b_i$ and q being coefficients. Typical values for the coefficients can be as follows: q=2, $a_i$=1/T with T the length of the film in seconds and $b_i$=0.5. Here, the distance criterion K is a combination of a temporal distance and of a confidence value of detected objects.

by using the same descriptors, as for example colour histograms, that have been used, in step 212, for the segmentation of the set of images into different shots and optionally into scenes, selecting images of other shots or scenes having a similar colour composition that is similar to the colour composition of the representative key image, in at least one region of these images. Similar composition means for instance similar hue, similar saturation, or similar luminance. The distance criterion between a key image to select and the representative key image is then related to the colour difference which can be calculated by hue difference, saturation difference, luminance difference, texture difference, contour difference and a combination thereof. Other colour spaces such as XYZ or CIECAM02 LCh colour spaces of the International Commission of Illumination (CIE) can be used. The colour differences may be calculated only in sub-parts of images, for example in regions of dominant, homogeneous colour.

Again by using the same descriptors, as for example colour histograms, that have been used, in step 212, for the segmentation of the set of images into different shots and optionally into scenes, selecting images of other shots or scenes having a colour composition opposite to the colour composition of the representative key image, in at least one region of these images. The distance criterion between an image to select and the representative key image is then related to the opposite of the colour difference which can be calculated by hue difference, saturation difference, luminance difference, texture difference, contour difference and a combination thereof. Other colour spaces such as XYZ or CIECAM02 LCh colour spaces of the International Commission of Illumination (CIE) can be used. The colour differences may be calculated only in sub parts of images, for example in regions of dominant, homogeneous colour.

It should be noted that where the description states that the operator defines a number to perform the second selection, as J, P, N above, an alternative solution is that the number is defined by the system.

Then, in a fifth step of the method, the set of selected close images is displayed 240 together with the current representative key image in order to perform a third selection which is manual. It is preferred that the spatial arrangement of displayed images may be changed by the operator in order to help him to choose which of the selected close images are to be displayed close to the current representative key image. It is also preferred that the operator may choose the number of images displayed as well as their size. Such a display operation is used to perform a manual third selection of a set of images to be colour corrected among all the "close" key images that are related to the same representative key image and that have been previously selected, and, if necessary, to add manually other images of the film which are not part of the selected close images. The goal of this display operation is to correct manually two kinds of errors that typically occur in the previous automatic selection of close images. First, there may be close key images that are not judged as close by the operator and that are deleted manually from the selection of close key images. Second, there may be close key images that are judged close by the operator but that are not included in the selection of close key images and that are manually added to the selection of close key images. The operator judges by its own eyes the distance and similarity between images according to criteria that are relevant for the colour correction operation such as saturation, luminance, hue, texture and contours.

Then, in a sixth step, a colour correction 220' is applied to the selected "close" images of the fifth step, which is based on the reference colour correction 220.

As an example of colour correction, when the reference colour correct ion has been performed for a single object in the representative key image, the same colour correction can be applied to the occurrence of the object in the other close images. The colour correction of these objects may be applied in these close images in an adaptive way, i.e. depending of their specific colour composition. For example, if the colour correction is an increase of saturation, the saturation may be more in creased in saturated images than in non-saturated images.

At the end of this sixth step, a colour corrected set of images or film is obtained.

Its considered that the extraction of the following operators performs a so-called visual summary of the film or set of images to be colour corrected:

the key image selector operator that has been used to perform the first selection of representative key images, with its segmentation operator, its descriptors, and the object detection operator, the relationship operator that has been used to measure the distance between images in order to perform the second selection of "close" images that all have importance with respect to the current colour correction operation that have been applied to the selected representative key image.

Optionally, other rounds of colour correction according the six steps above can be performed on the set of images or film. Any new round would start with an updating 250 of this visual summary. After the update, the operator can for instance verify that no unwanted update of the images was performed by the system. In other following rounds of colour correction according the six steps above, other kind of selections and other kind of reference colour correction can be used, using for instance other segmentation operator, other descriptors, other object detection operators, and other relationship operators.

An example will now further explain the invention. Suppose that an episode of a television series has been shot. Before the invention, colour correction was usually applied chronologically, making it difficult to correct colour for an object throughout the episode without extensive consultation of detailed script notes. With the invention, however, colour correction may be applied in a more judicial manner and it is possible to deal with the most important issues first. Suppose that the episode contains the following scenes:

1. an indoor scene with the star and two other actors, 2a. a first part of an outdoor scene set during twilight with the star and one actor, 2b. a second part of the outdoor scene, re-shot in a different light, 3. an indoor scene without the star, but with a product placed telephone, 4. another outdoor scene in which the star makes a brief appearance with the product placed telephone.

With the invention, it is thus possible to generate a summary and to set up a priority list, which for example may look as follows:

1. Make sure that the light in the first and the second part of the outdoor scene looks as though it was shot in one go, 2. Darken the star's face for a tanned look in all the scenes, 3. Make the product placed telephone easier to distinguish, 4. Whiten everyone's teeth.

Using the priority list is possible as the visual summary will present e.g. images of the star from different scenes, which enables the operator to darken her face in all the displayed scenes at once, which is a considerable advantage over having to go through the scenes chronologically or having to consult script notes.

The invention claimed is:

1. A method for colour correction of a set of images, comprising the following steps:
    performing a visual summary of said set of images, comprising the extraction of a selection operator able to select at least one representative key image among images of said set and the extraction of at least one relationship operator able to calculate a distance between images according to a given relationship between these images,
    a first selection of at least one representative key image among the images of said set of images, using said selection operator; the application of a reference colour correction to said selected at least one representative key image;
    a second selection of images according to a distance criterion related to said at least one representative key image, using the at least one relationship operator to calculate the distance between each image and said at least one representative key image;
    a third selection of images to be corrected at least among images of the second selection, and
    applying colour correction to images of said third selection based on said reference colour correction.

2. Method for colour correction according to claim 1 wherein said relationship according to which the relationship operator is able to calculate a distance between images for said second selection is related to said reference colour correction that is applied to this representative key image.

3. Method for colour correction according to claim 2 wherein all images of said second selection comprise preferably at least one feature which is close to a feature of the selected at least one representative key image that has been corrected by said application of the reference colour correction.

4. Method for colour correction according to claim 1, wherein said relationship operator that is used for said second selection comprises at least one descriptor that is chosen in the group formed by a colour histogram operator, a distribution of spatial frequency band energies operator, and a distribution of contour directions of objects operator.

5. Method for colour correction according to claim 1, wherein said visual summary comprises the extraction of a segmenting operator that is able to define subsets of images that group consecutive images of said set of images.

6. Method for colour correction according to claim 1, wherein said relationship operator that is used for said second selection is able to detect at least one similar object in related images.

7. Method for colour correction according to claim 1, wherein said distance that is calculated by the relationship operator that is used for said second selection is a temporal distance between these images.

8. Method for colour correction according to claim 1, wherein said third selection is performed by a visual comparison of images of said second selection with said representative key image.

9. Method for colour correction according to claim 1, wherein said first selection operator is based on said at least one relationship operator.

* * * * *